(12) United States Patent
Kuzma

(10) Patent No.: US 6,246,703 B1
(45) Date of Patent: *Jun. 12, 2001

(54) APPARATUS AND METHOD FOR GENERATING SERVICE PROFILE IDENTIFICATION

(75) Inventor: Andrew J. Kuzma, Portland, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/896,216

(22) Filed: Jul. 17, 1997

(51) Int. Cl.[7] ....................................... H04J 3/12
(52) U.S. Cl. ............................. 370/524; 370/498
(58) Field of Search ..................... 370/464, 465, 370/522, 524, 252, 264, 904, 463, 401, 249, 255, 384, 230, 498

(56) References Cited

U.S. PATENT DOCUMENTS

| | | | |
|---|---|---|---|
| 5,530,692 | * | 6/1996 | Avargues ............... 370/524 |
| 5,715,241 | * | 2/1998 | Glass ..................... 370/252 |
| 5,793,751 | * | 8/1998 | Baker .................... 370/250 |
| 5,931,928 | * | 8/1999 | Brennan ................. 370/401 |

* cited by examiner

Primary Examiner—Douglas Olms
Assistant Examiner—Ricardo M. Pizarro
(74) Attorney, Agent, or Firm—Duane, Morris & Heckscher LLP

(57) ABSTRACT

An apparatus and method for generating an access identifier (ID) for a communications line of a communications network capable of providing a relatively low bandwidth channel and at least one relatively high bandwidth channel over the communication line. According to one embodiment, a virtual circuit is established with an access ID server using the relatively low bandwidth channel. An access ID is requested from the access ID server over the virtual circuit that will enable a circuit to be established using the at least one relatively high bandwidth channel.

15 Claims, 2 Drawing Sheets

100

200

300

APPARATUS AND METHOD FOR GENERATING SERVICE PROFILE IDENTIFICATION

BACKGROUND OF THE INVENTION

1. Field of the Invention

The present invention relates to the use of communications networks and, in particular, to the use of integrated services digital networks (ISDN).

2. Background Information

It is often desirable to use high-bandwidth communications networks, such as ISDN, to communicate with specified end points. ISDN lines and services are provided by ISDN providers, such as telephone companies. In some present ISDN systems, such as North American ISDN, a user employs a service profile identifier (SPID) to establish an ISDN communications channel or circuit through a particular ISDN port over a particular physical ISDN line. The SPID identifies what types of communication and other services may be provided to the user over the particular ISDN line. The SPID may also be applied by the ISDN provider to a database that specifies the services allowed for a given user over a given ISDN line.

Thus, for a user of a particular ISDN line who has previously purchased a certain group of services from an ISDN service provider, a SPID is established ahead of time, and provided to the user, which allows usage of the ISDN line by the user in accordance with the permitted group of services. The SPID is typically a multi-digit number (for example, a ten to fifteen digit number) that is transmitted to the user once it is generated, for example by regular mail, after the user and ISDN provider agree to a particular group of ISDN services.

In ISDN, users have access to both a first-type channel which is a relatively low-bandwidth data channel (D channel), and one or more second-type or relatively high-bandwidth bearer channels (B channels). Both B and D channels are full duplex digital communication channels. A D channel is used to switch on and control the use of B channels. To access an ISDN connection or coupling, the D channel is used to establish at least one B channel. Another B channel may be added as desired for higher bandwidth signal throughput. For example, one B channel may be used for data communications and a second B channel may be used for voice communications.

When a user of an ISDN line wants to establish an ISDN coupling to a particular end point, such as an Internet service provider (ISP), a "set up" or "call request" message is transmitted over a D channel to the ISDN switching system of the central office system of the ISDN provider, which specifies the ISP which is the end point to be called and the type of ISDN coupling to be set up. The SPID is also transmitted to the ISDN provider during this set up process. The SPID may be used by the ISDN provider to access a database which specifies the services associated with the SPID and associated ISDN line. The ISDN provider is thus able to manage and control use of its ISDN lines, bill for usage, and the like.

If the ISDN provider approves the requested call to be placed and ISDN services requested, after using the supplied SPID to check permitted ISDN services in the database, the switching system transmits a message to the ISP notifying the ISP of the inbound call. If the ISP answers the inbound call, a B channel circuit mode connection or coupling is set up between the ISP and the user.

Unfortunately, a SPID that provides the desired level of services for a particular ISDN line is not always available. For example, users of ISDN are not always physically present at their own ISDN terminal, for which a SPID may already be set up. The user may be in an airport or hotel, and may desire to access the ISDN line of a public ISDN terminal for high-bandwidth communication purposes. Since it is not known which ISDN services a given user would like to use ahead of time, it is difficult to provide a fixed SPID at each ISDN terminal. Also, since each SPID is unique to a given ISDN terminal and line and the user does not know ahead of time which ISDN terminal he will use, it is difficult to provide a user ahead of time with a SPID for arbitrary ISDN terminals. Thus, currently it is difficult for a user to gain mobile access to an ISDN line.

SUMMARY

An apparatus and method for generating an access identifier (ID) for a communications line of a communications network capable of providing a first-type channel and at least one second-type channel over the communication line. According to one embodiment of the invention, a virtual circuit is established with an access ID server using the first-type channel. An access ID is requested from the access ID server over the virtual circuit that will enable a circuit to be established using the at least one second-type channel.

BRIEF DESCRIPTION OF THE DRAWINGS

These and other features, aspects, and advantages of the present invention will become more fully apparent from the following description, appended claims, and accompanying drawings in which:

DESCRIPTION OF THE EMBODIMENT

X.25 Switched Virtual Circuit for SPID Generation

Figure 1:
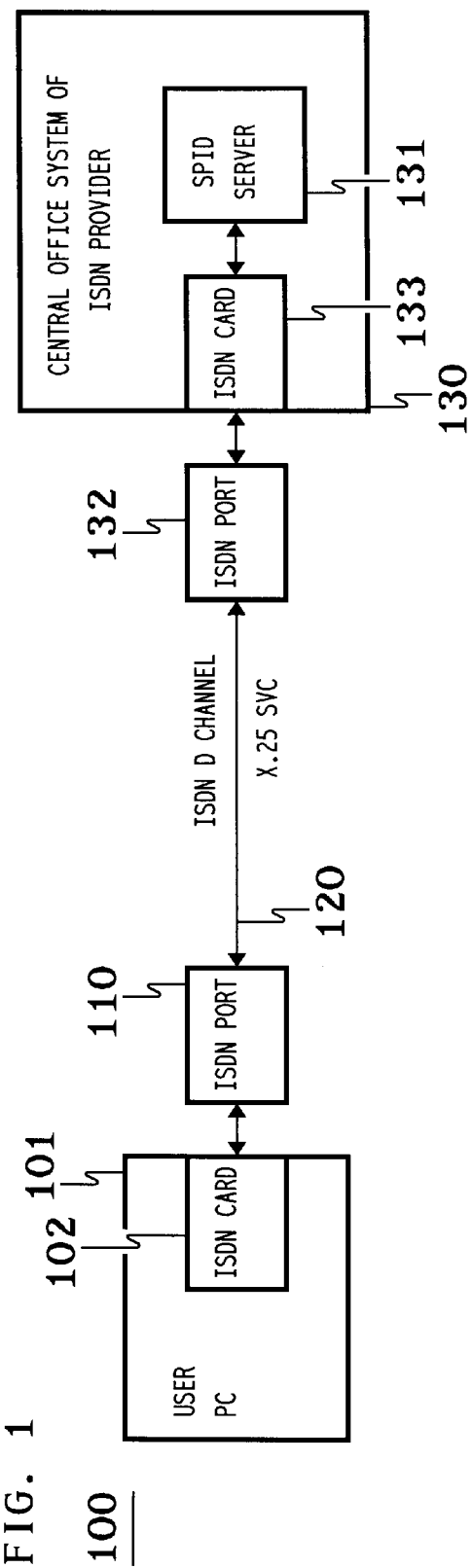
FIG. 1 shows an ISDN system for generating a SPID in accordance with an embodiment of the present invention.

Referring now to FIG. 1, there is shown an embodiment 100 of an ISDN system for generating a SPID in accordance with the present invention. In general, the SPID may be considered to be an access identifier (ID) that allows an ISDN line to be used. ISDN system 100 comprises a user's personal computer (PC) 101 having an ISDN card 102, an ISDN port 110, an ISDN line 120, and a central office system 130 of the ISDN provider, which includes an ISDN card 133, an ISDN port 132, and a SPID server 131. For example, ISDN port 110 may be a physical ISDN jack at a public telephone of a hotel room or airport. PC 101 and central office system 130, when coupled via ISDN, comprise nodes or end points of the ISDN network.

The user may couple the port of the ISDN card 102 of PC 101 into ISDN port 110 to access ISDN line 120. The user may wish, for example, to place an ISDN call to an ISP to access email, to browse the Internet, and for other communication purposes. Unfortunately, as previously explained, if the user does not know the SPID for ISDN port 110 and line 120, the user will be unable to place an ISDN call to a desired end point such as the user's ISP. In an embodiment in accordance with the present invention, however, the X.25 protocol, described below, may be used to contact the ISDN provider to request a SPID, which is then generated by SPID server 131 and transmitted to PC 101. PC 101 may thus be referred to as a calling node.

ISDN includes the X.25 packet switched network protocol, which may be used to provide a packet switched network coupling through a D channel of ISDN, referred to as an X.25 switched virtual circuit (SVC). A virtual circuit such as an X.25 SVC can be used to set up what appears to be a physical point-to-point circuit between users, even though the data exchanged is broken up into and transmitted as discrete packets, each of which contains appropriate addressing information to enable it to reach the appropriate destination endpoint via the network. A B channel is used to establish a circuit mode connection between specified endpoints, in which packets and associated packet addressing are not utilized. Such communications over B and D channels are further described in William Stallings, *Data and Computer Communications*, 2d ed. (New York: MacMillan, 1988), pp. 197–98 and 202–03.

Thus, in addition to controlling usage of B channels during a standard ISDN coupling, a D channel of ISDN may also be used to establish an X.25 SVC, which may provide relatively low bandwidth data communications (basic ASCII email services, news feeds, and automated data collection, for example). To establish an X.25 SVC, the X.25 protocol is used to pass an X.25-compatible message to a switch of the central office of the ISDN provider to request an X.25 packet switched network coupling to a specified end point or node of the ISDN network.

As explained previously, for a user to establish an ISDN communications channel (for example, containing a D channel and one or more B channels) through a particular ISDN port over a particular ISDN line, a SPID is employed by the user. However, ISDN is configured so that a SPID is not required in order for a user to establish an X.25 SVC over a D channel of ISDN, and central office switches supplying ISDN are configured with X.25 packet handlers. The X.25 protocol and related standards are described in Uyless Black, *X.25 and Related Protocols* (Los Alamitos, Calif.: IEEE Computer Society Press, 1991), ISBN 0-8186-8976-5; and in International Telecommunication Union (ITU) Recommendation X.25 (10/96): "Interface between Data Terminal Equipment (DTE) and Data Circuit-terminating Equipment (DCE) for terminals operating in the packet mode and connected to public data networks by dedicated circuit." ISDN is described in the ITU's various Series I Recommendations. ITU Recommendations maybe obtained from: International Telecommunication Union, Sales and Marketing Service, Place des Nations, CH-1211 Geneva 20, Switzerland, telephone 41 22 730 6141, fax 41 22 730 5194, or from the world-wide web (WWW) at <http://www.itu.ch/>.

ISDN System for Placing ISDN Call

Figure 2:
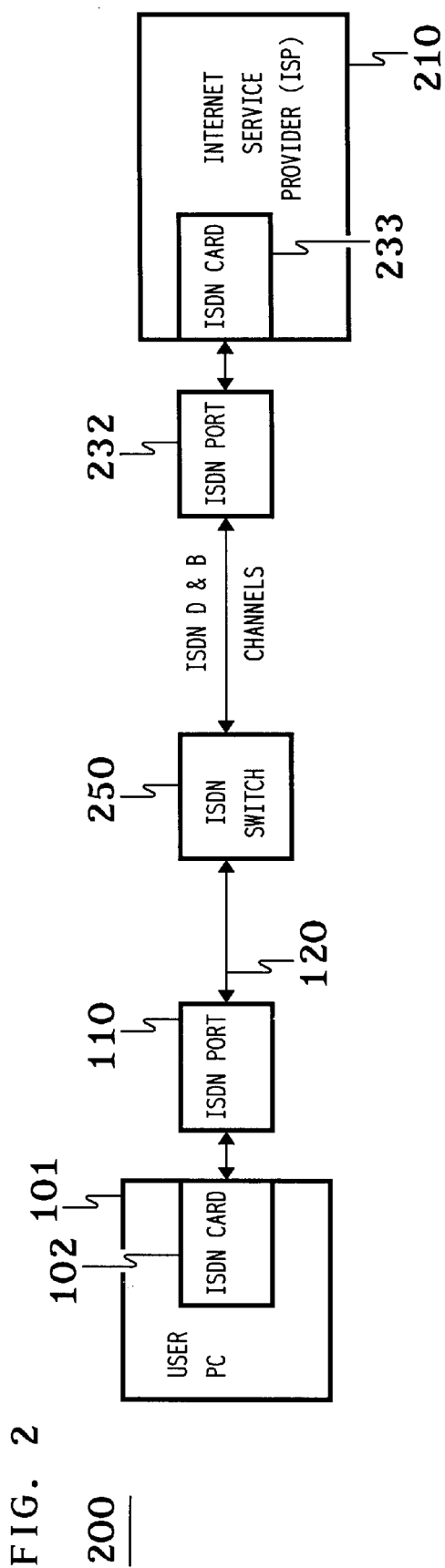
FIG. 2 depicts an ISDN system for placing an ISDN call with the SPID generated by the ISDN system of FIG. 1, in accordance with an embodiment of the present invention.

Referring now to FIG. 2, there is illustrated an embodiment 200 of an ISDN system for placing an ISDN call with the SPID generated by ISDN system 100 of FIG. 1 to, for example, an ISP 210. ISDN system 200 comprises PC 101 with ISDN card 102, ISDN port 110, and ISDN line 120 of ISDN system 100 of FIG. 1. ISDN system 200 further comprises ISDN switch 250 and ISP 210, which includes an ISDN card 233 and an ISDN port 232. ISDN switch 250 is an ISDN switching system provided by central office system 130 of the ISDN provider, which allows an ISDN call to be placed to a specified end point using a SPID.

Once PC 101 has been given the SPID by SPID server 131, an ISDN coupling, for example having a D channel for control and one or more B channels for high-bandwidth data throughput, may thus be established over ISDN line 120 to ISP 210 via ISDN switch 250. As previously indicated, the SPID contains information that can be used to specify the services that the user may use over ISDN line 120. For example, the SPID may be used by the ISDN provider to access a database which specifies the ISDN services allowed by the user associated with the SPID over ISDN line 120. Thus, for example, the SPID may indicate whether the user can place data calls and/or voice calls, whether call forwarding or call waiting is available, whether multi-party conference calling is permitted, or whether only one or two B channels may be used.

Method of Generating SPID and Placing ISDN Call with Generated SPID

Figure 3:
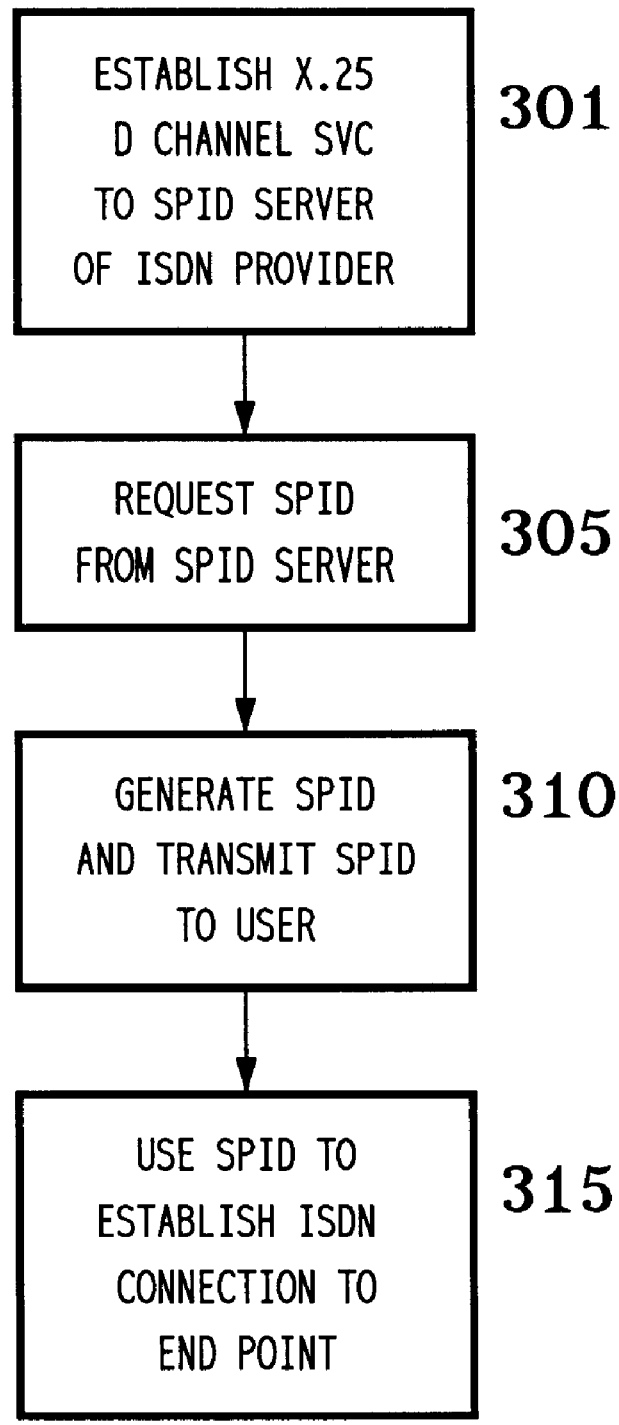
FIG. 3 is a flow diagram illustrating the method of operation of generating a SPID and placing an ISDN call with the systems of FIGS. 1 and 2, in accordance with an embodiment of the present invention.

Referring now to FIG. 3, there is shown a flow diagram 300 illustrating an embodiment of a method of operation of generating a SPID and placing an ISDN call with ISDN systems 100 and 200 of FIGS. 1 and 2, in accordance with the present invention. If the user does not know the SPID for ISDN port 110 and line 120, a D channel X.25 SVC is established between PC 101 and SPID server 131 of central office system 130 of the relevant ISDN provider (step 301 of FIG. 3). The X.25 SVC call may be placed to SPID server 131 by dialing the equivalent of a toll-free telephone number, for example. As explained above, a SPID need not be known ahead of time in order to establish the X.25 SVC.

The user of PC 101 requests a SPID for ISDN port 110 and line 120 that will be sufficient to allow an ISDN call with certain features or services, defined by call parameters, to be set up and placed to a specified end point, such as the user's ISP (step 305). The request specifies both the user's identity and the ISDN services requested. The requested ISDN services may be in accordance with a prior agreement between the user and the ISDN provider, in which case the ISDN provider stores in a local database a user profile having information concerning the permissible types of ISDN-related services that the user may access. SPID server 131 therefore analyzes the request, for example by comparing the requested services and ISDN call parameters against the user profile stored in the local database. The request will be granted if the user profile indicates that the user has permission or prior arrangement to access the requested ISDN services. Alternatively, the user may be unknown and may have no prior agreement with the ISP, but may request and pay for a temporary set of ISDN services by paying, for example, with a credit card.

If the request is granted, the ISDN provider generates a SPID and transmits it to PC 101 (step 310). This SPID may be used to access ISDN services from ISDN port 110, for example to place ISDN calls over ISDN line 120 (step 315). The SPID may be leased temporarily to the user, for example, in accordance with the prior agreement between the user and the ISDN provider.

The above-described SPID-generation process may be used even if a SPID is already known or defined for a given ISDN port and line. For example, if a SPID is already defined for a given ISDN line for a first user, a second or temporary user of the ISDN line may wish to have a separate SPID assigned, so that the second user's usage of the ISDN line does not incur charges on the first user's bill from the ISDN provider.

TCP/IP Coupling

In one embodiment of the present invention, when PC 101 places the X.25 SVC call to SPID server 131 to request a SPID, a WWW session is established between PC 101 and SPID server 131. Servers may be established on the WWW that are hyper text transport protocol (HTTP) compatible and that serve information through the use of web pages to browsers. Web pages are created using the hyper-text markup language (HTML). The transmission control protocol/Internet protocol (TCP/IP) is a packet switching control protocol used for networks, such as public networks (e.g., the Internet), and private networks (e.g., Intranets).

The TCP/IP protocol is encapsulated within the X.25 logical circuit carried by the D channel of ISDN. Thus, during an X.25 SVC, a TCP/IP coupling may be set up within the X.25 SVC to allow for web-based type HTTP communication. Therefore, in one embodiment of the present invention, when PC 101 places the X.25 SVC call to SPID server 131 to request a SPID, a TCP/IP coupling is established to set up a Web session between PC 101 and SPID server 131, which may offer various options and information to the user of PC 101 in requesting a SPID with various services or features. For example, an HTML form may be provided by SPID server 131 to PC 101, which the user may fill out to request a SPID. This form may be relatively simple so that it may be transmitted even over the relatively-low bandwidth TCP/IP coupling within the X.25 SVC. Alternatively, PC 101 may place a call to central office system 130 to request a SPID, without establishing a WWW session, but by otherwise requesting that a SPID be generated.

The present invention, therefore, provides for a method and apparatus for generating an access identifier, such as a SPID, for a communications line, such as an ISDN line, of a communications network such as an ISDN. The ISDN is capable of providing a first-type channel, such as a D channel, and at least one second-type channel, such as a B channel, over the communications line. The D channel may have a bandwidth of 9600 bits per second, and B channels may have a bandwidth of 64 k bits per second, so that the first-type channel is a relatively low-bandwidth channel with respect to the second-type channel, and the second-type channel is a relatively high-bandwidth channel with respect to the first-type channel. A virtual circuit, such as an SVC, is established with an access ID server, such as SPID server 131, using the first-type channel. The access ID (e.g., the SPID) is requested from the access ID server over the virtual circuit that will enable a circuit to be established using the at least one second-type channel. The circuit to be established using the at least one second-type channel may be, for example, a B channel circuit mode connection.

As will be understood, the present invention may be embodied in the form of computer-implemented processes and apparatuses for practicing those processes. The present invention may also be embodied in the form of computer program code embodied in tangible media, such as floppy diskettes, CD-ROMs, hard drives, or any other computer-readable storage medium, wherein, when the computer program code is loaded into and executed by a computer or by a distributed network of computers, the computer or network becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for communicating over a communications line of a communications network capable of providing a first-type channel having a relatively low bandwidth and at least one second-type channel having a relatively high bandwidth over the communications line, the method comprising the steps of:
   (a) establishing a virtual circuit that does not require an access identifier (ID) between a calling node of the network and an access ID server of the network using the first-type channel, wherein an access ID is required to be provided to a switching system of a central office facility of the network in order to establish a circuit over a second-type channel;
   (b) requesting an access ID from the access ID server over the virtual circuit that will enable a circuit to be established between the calling node and an end point of the network using the at least one second-type channel;
   (c) receiving, with the calling node, the access ID from the access ID server over the virtual circuit; and
   (d) establishing the circuit over at least one second-type channel by providing the access ID to the switching system.

2. The method of claim 1, wherein the communications network comprises an integrated services digital network (ISDN).

3. The method of claim 2, wherein the first-type channel comprises an ISDN D channel, each second-type channel comprises an ISDN B channel, and the virtual circuit comprises a D channel X.25 switched virtual circuit.

4. The method of claim 3, wherein the at least one B channel comprises one B channel.

5. The method of claim 3, wherein the at least one B channel comprises two B channels.

6. The method of claim 1, wherein the access ID comprises a service profile identifier.

7. The method of claim 1, wherein the access ID server is provided by the central office facility of the network.

8. A system, comprising:
   (a) a communication network capable of providing a first-type channel having a relatively low bandwidth and at least one second-type channel having a relatively high bandwidth over a communication line of the network;
   (b) a node of the network having an access ID server capable of generating in response to a request an access ID, wherein an access ID is required to be provided to a switching system of a central office facility of the network in order to establish a circuit over the second-type channel; and
   (c) a calling node of the network that establishes a virtual circuit that does not require an access ID with the access ID server using the first-type channel to request the access ID from the access ID server, wherein the access ID will enable a circuit to be established between the calling node and an end point of the network using the at least one second-type channel, wherein the calling node receives the access ID from the access ID server over the virtual circuit and establishes the circuit over at least one second-type channel by providing the access ID to the switching system.

9. The system of claim 8, wherein the communications network comprises an ISDN.

10. The system of claim 9, wherein the first-type channel comprises an ISDN D channel, each second-type channel comprises an ISDN B channel, and the virtual circuit comprises a D channel X.25 switched virtual circuit.

11. The system of claim 10, wherein the at least one B channel comprises one B channel.

12. The system of claim 10, wherein the at least one B channel comprises two B channels.

13. The system of claim 8, wherein the access ID comprises a service profile identifier.

14. The system of claim 8, wherein node comprises the central office facility.

15. An apparatus, comprising:
(a) means for coupling to a communication network capable of providing a first-type channel having a relatively low bandwidth and at least one second-type channel having a relatively high bandwidth over a communication line of the network, wherein an access ID is required to be provided by a calling node of the network to a switching means of the network in order to establish a circuit over a second-type channel;
(b) means for receiving a request for an access ID from the calling node via a virtual circuit that does not require an access ID established by the calling node using the first-type channel, wherein the access ID will enable a circuit to be established between the calling node and an end point of the network using the at least one second-type channel;
(c) means for generating the access ID in response to the request;
(d) means for transmitting the access ID to the calling node via the virtual circuit; and
(e) the switching means for receiving the access ID from the calling node and for establishing the circuit between the calling node and the end point using the access ID.

* * * * *